United States Patent [19]
Gellert

[11] Patent Number: 5,118,279
[45] Date of Patent: Jun. 2, 1992

[54] INJECTION MOLDING APPARATUS WITH ANGLED TIP PROBE

[76] Inventor: Jobst U. Gellert, 7A Prince Street, Georgetown, Ontario, Canada, L7G 2X1

[21] Appl. No.: 799,205

[22] Filed: Nov. 27, 1991

[30] Foreign Application Priority Data

Oct. 1, 1991 [CA] Canada .................. 2052595

[51] Int. Cl.⁵ .......................................... B29C 45/20
[52] U.S. Cl. ............................ 425/547; 264/328.14; 264/328.15; 425/549
[58] Field of Search ................. 425/547, 548, 549; 264/328.14, 328.15

[56] References Cited

U.S. PATENT DOCUMENTS

| 4,682,944 | 7/1987 | Muller | 425/549 |
| 4,768,945 | 9/1988 | Schmidt et al. | 425/549 |
| 4,820,147 | 4/1989 | Gellert | 425/549 |

OTHER PUBLICATIONS

Mold Masters, Injection molding with compact master shot single nozzle hot runners, Nov. 1990.

*Primary Examiner*—Tim Heitbrink
*Attorney, Agent, or Firm*—Dalesman & Company

[57] ABSTRACT

Injection molding apparatus wherein a heated probe extends into a well in a cavity plate having a generally spherical forward end. The forward end of the heated probe has at least one conical tip which extends outwardly at an angle into a conical recess leading to the gate. Each conical recess has an included angle of at least 90° and the conical recess and conical tip extend outward along the same central axis at an angle to the longitudinal axis of the probe. This allows the tip to extend fully into the recess without intefering with withdrawal for cleaning or repair. The included angle of the conical tip is substantially less than the included angle of the conical recess which gradually accelerates the flow of melt as it approaches the gate.

4 Claims, 2 Drawing Sheets

INJECTION MOLDING APPARATUS WITH ANGLED TIP PROBE

BACKGROUND OF THE INVENTION

This invention relates generally to injection molding and more particularly to injection molding apparatus where the forward end of a heated probe has at least one conical tip which extends outwardly at an angle into a conical recess leading to the gate.

Heated probes which have pointed tips and are mounted to extend into an injection molding melt passage are well known in the art. For instance, the applicant's U.S. Pat. No. 4,820,147 which issued Apr. 11, 1989 discloses a heated probe which extends through sleeve seated in a cavity plate. The applicant's Canadian patent application serial number 2,032,728 filed Dec. 19, 1990 entitled "Injection Molding Probe with Varying Heat Profile" shows providing the electrical heating element of such a probe with different numbers of multiple runs along its length. The applicant's Canadian patent application serial number 2,037,186 filed Feb. 28, 1991 entitled "Injection Molding Probe with a Longitudinal Thermocouple Bore and Off Center Heating Element" relates to similar apparatus in which the heating element is relocated and a thermocouple bore is provided. However, these previous probes all have the disadvantage that the pointed tip only extends forwardly along the central axis.

Heated nozzles having pointed tips are also known in the art. While the applicant's U.S. Pat. No. 4,768,945 which issued Sept. 6, 1988 does show a nozzle with an angled tip for edge gating, it extends at a shallow angle to the central axis. Mold-Masters Limited brochure E-CMSSN-11-90 entitled "Injection Molding with Compact Master-Shot Single Nozzle Hot Runners" published November 1990 similarly shows on page 17 a nozzle having a single angled tip for hot tip gating. In addition to being a nozzle and not a probe, it is restricted to a single gate.

SUMMARY OF THE INVENTION

Accordingly, it is an object of the present invention to at least partially overcome the disadvantages of the prior art by providing injection molding apparatus wherein the well in the cavity plate has a conical recess with an included angle of at least 90° and the heated probe has a conical tip which extends outwardly at an angle a substantial distance into the recess.

To this end, in one of its aspects, the invention provides injection molding apparatus having an elongated heated probe with a rear end, a forward end, an outer body having a generally cylindrical forward portion, and an electrical heating element extending generally longitudinally in the body, the forward portion of the body of the probe having a predetermined outer diameter and a longitudinal central axis, the probe being mounted to extend into a well in a cavity plate with a melt passage extending between the probe and the surrounding cavity plate, the well having a wall and a forward end with at least one gate extending through the cavity plate to a cavity, with the improvement wherein the wall of the well at the forward end of the well has at least one conical recess leading to the at least one gate, the at least one conical recess has an included angle of at least 90° and a central axis which extends outwardly at an angle to the longitudinal central axis of the forward portion of the body of the probe, and the forward end of the probe has at least one conical tip which extends outwardly beyond the outer diameter of the forward portion of the body of the probe a substantial distance into the at least one conical recess in the wall of the well, the at least one conical tip having a central axis which is substantially the same central axis which extends through the at least one conical recess.

DETAILED DESCRIPTION OF THE DRAWINGS

Figure 1:
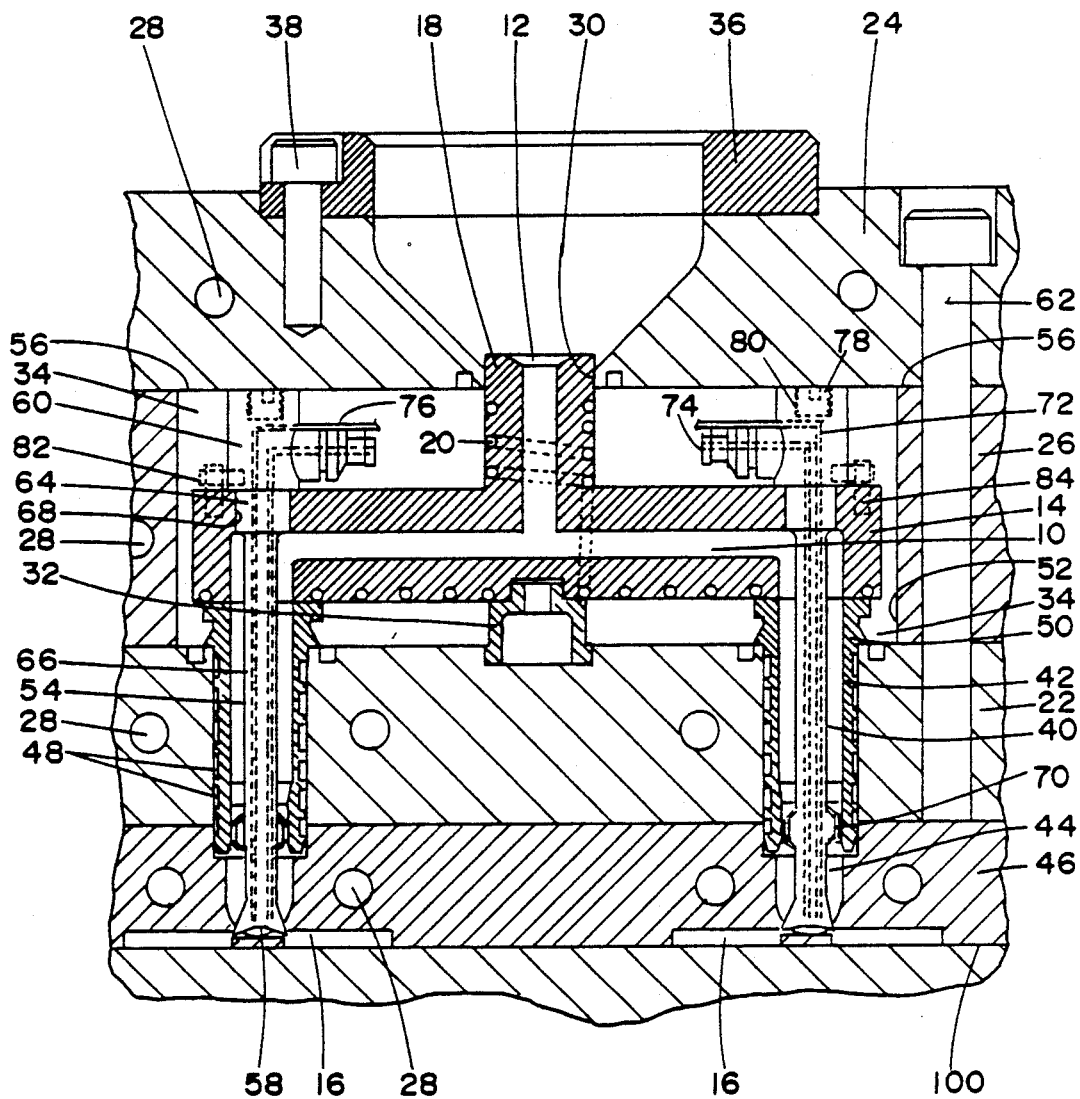
FIG. 1 is a sectional view of a portion of a multicavity injection molding system according to a first embodiment of the invention.

Reference is first made to FIG. 1 which shows a portion of an injection molding system having a melt passage 10 which branches from an inlet 12 in a heated melt distribution manifold 14 to convey pressurized melt to a number of spaced cavities 16. The manifold 14 has an integral heated inlet portion 18 and an electrical heating element 20 as described in Mold-Masters Canadian patent application serial number 2,044,793-1 filed Jun. 13, 1991 entitled "Injection Molding Manifold with Integral Heated Inlet Portion." The manifold 14 extends between a manifold support plate 22 and a back plate 24 which are separated by a spacer plate 26. These plates are cooled by pumping cooling water through cooling conduits 28. The manifold 14 is accurately centrally located in this position by the cylindrical inlet portion 18 extending through a matching opening 30 in the back plate 24 and by a central locating ring 32 which is seated between it and the manifold support plate 22. As can be seen, this provides an insulative air space 34 between the heated manifold 14 and the surrounding cooled plates. A circular collar 36 is secured in a seat in the back plate 24 by bolts 38.

The system or apparatus according to the invention has a number of heated probes 40. Each probe extends through a sealing sleeve 42 and into a well 44 in a cavity plate 46. Each sealing sleeve 42 has a ridged outer surface which provides insulative air grooves 48 between it and the surrounding manifold retainer plate 22 and cavity plate 46. Each sealing sleeve 42 also has a larger diameter rear collar portion 50 which extends between the manifold 14 and the manifold support plate 22 to prevent leakage of pressurized melt from the melt passage 10 into the air space 34. The inner diameter of the sealing sleeve 42 is the same as the diameter of the adjacent bore 52 in the manifold 14 which is large enough to provide the portion of the melt passage 10 which extends around the heated probe 40.

Each probe 40 has a generally cylindrical outer elongated steel body 54, a rear end 56, and a forward end 58 which will be described in more detail below. Each probe 40 has a rear portion 60 which extends between the manifold 14 and the back plate 24. The back plate 24 is secured in position by bolts 62 which extend through the spacer plate 26 into the manifold retainer plate 22. The back plate 24 thus applies a force to the rear ends 56 of the probes 40 which holds the probes 40, manifold 14 and sealing sleeves 42 securely in position.

The outer body 54 of each probe 40 has an intermediate portion 64 extending between the larger diameter rear portion 60 and a smaller diameter forward portion 66. The intermediate portion 64 is just long enough to extend to the melt passage 10, and its diameter is just large enough to fit precisely in the matching portion 68 of the bore 52 through the manifold 14 to prevent leakage of the pressurized melt between them.

As described in the applicant's Canadian patent application 2,037,186 mentioned above, the forward portion 66 of each probe 40 has four equally spaced fins 70 which project outwardly to contact the sealing sleeve 42 to accurately locate the probe 40 at the operating temperature. The melt flows between the fins 70 which are smoothly shaped to avoid any dead spots in the flowing melt. Each probe 40 also has a longitudinally extending electrical heating element 72 which is integrally brazed into the outer steel body 54. While the heating element 72 is shown as extending straight for ease of illustration, it normally is bent back upon itself in a predetermined configuration to provide the probe 40 with a varying heat profile along its length as shown in the applicant's Canadian patent application 2,032,728 mentioned above. The heating element 72 extends radially outward to an external electrical terminal 74 on the rear portion 60 of the body 54 of the probe 40. A removable thermocouple wire 76 extends into a bore which extends longitudinally in the probe 40 beside the heating element 72 to monitor the operating temperature adjacent the forward end 58 of the probe 40. The removable thermocouple wire 76 is held in place by a retaining screw 78 which is received in a threaded bore 80 in the rear end 56 of the probe 40. The rear portion 60 of the body 54 of the probe 40 also has a locating pin 82 which extends outwardly between two posts 84 which extend from the manifold 14 to accurately locate the probe 40.

Figure 2:
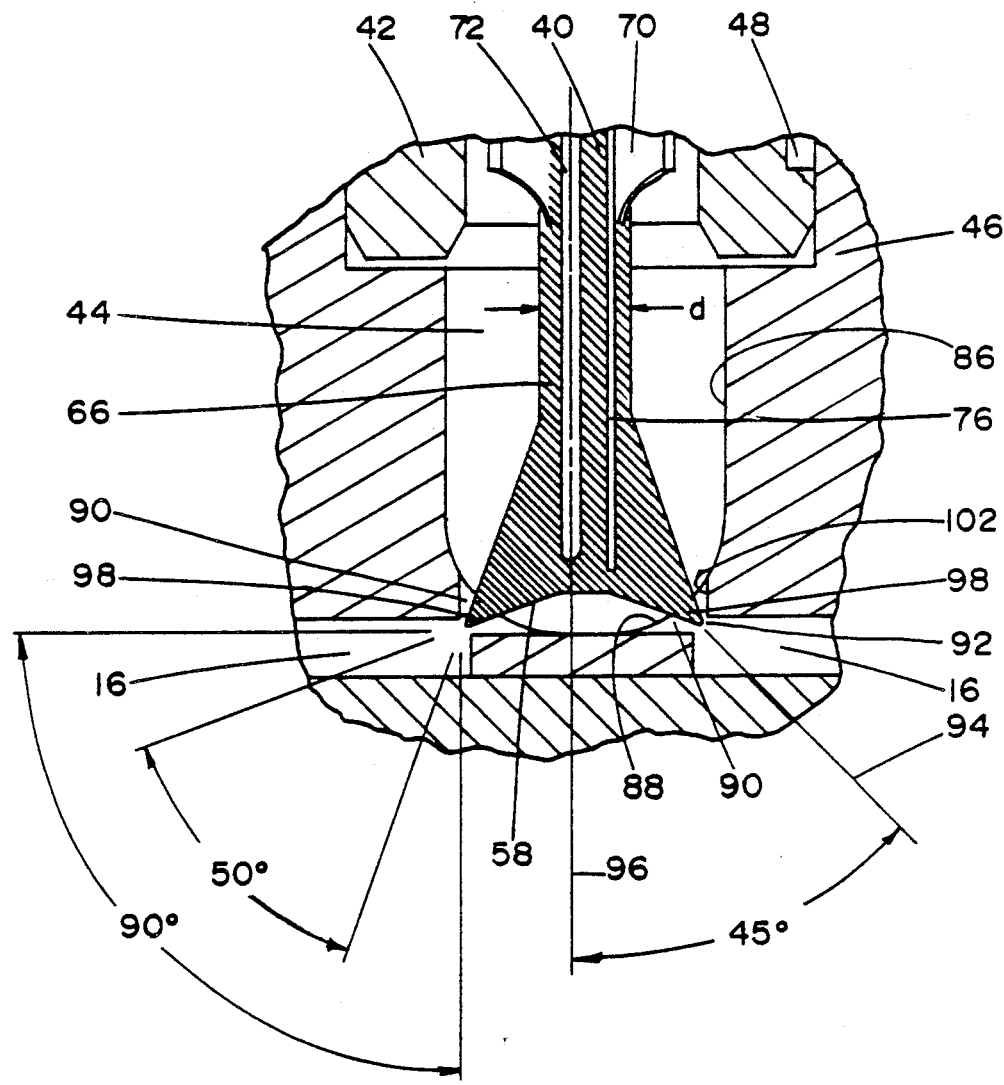
FIG. 2 is an enlarged portion of FIG. 1 showing the forward end of one probe and the surrounding well in the cavity plate.

Reference is now made to FIG. 2 to describe the configuration of the forward end 58 of each probe 40 and the surrounding wall 86 of the well 44 into which it extends. As can be seen, the well 44 in the cavity plate 46 has a spherical forward end 88 with a number of spaced conical recesses 90 in its wall 86. Each conical recess 90 extends to a gate 92 through the cavity plate 46 to one of the cavities 16. In this embodiment, each conical recess has a 90° included angle and a central axis 94 which extends outwardly at an angle of substantially 45° to the longitudinal central axis 96 of the forward portion 66 of the body 54 of the probe 40. The forward end 58 of the probe 40 has an equal number of spaced conical tips 98. Each of the conical tips 98 extends outwardly beyond the outer diameter "d" of the forward portion 66 of the body 54 of the probe 40 a substantial distance into a respective one of the conical recesses 90. Each probe 40 is accurately located by the locating pin 82 so that at the processing temperature, each conical tip 98 has substantially the same central axis 94 which extends through the conical recess 90 into which it extends.

As can be seen, when the conical recess 90 has an included angle of 90° and the central axis 96 extends at 45° to the longitudinal, one side 102 of the conical recess 90 extends parallel to the longitudinal axis 96. This allows the conical tip 98 to extend fully into the conical recess 90 without interfering with withdrawal of the cavity plate 46 if it is necessary for cleaning or repair. Thus, in other embodiments of the invention, the central axis may extend at different angles, but the conical recess 90 must have an included angle of at least 90°. In the embodiment shown, the conical tip 98 which extends into the 90° conical recess 90 has an included angle of substantially 50°. While this can vary somewhat for other embodiments, it is important that the included angle of the conical tip 98 be substantially less than the included angle of the conical recess 90 so that the flow of melt between them is gradually accelerated as it approaches the gate 92.

While only two conical recesses 90 and tips 98 are seen in this sectional view, this embodiment has four of each which are in alignment with four cavities 16 which are equally spaced around the forward end 58 of the probe 40. Other embodiments of the invention may have other numbers, including only a single conical tip 98 extending into a single conical recess 90 for some applications.

In use, the injection molding system or apparatus is assembled as shown. Electrical power is applied to the heating element 20 in the manifold 14 and the heating element 72 in each of the probes 40 to heat them to a predetermined operating temperature. Pressurized melt from a molding machine (not shown) is then injected into the melt passage 10 through the common inlet 12 in the inlet portion 18 of the manifold 14 according to a predetermined cycle in a conventional manner. The pressurized melt flows along around each heated probe 40, then into each conical recess 90 around the respective conical tip 98 and through the adjacent gate 92 to fill the cavities 16. After the cavities are filled, injection pressure is held momentarily to pack and then released. After a short cooling period, the mold is opened along the parting line 100 to eject the molded products. After ejection, the mold is closed and injection pressure is reapplied to refill the cavities. This cycle is continuously repeated with a frequency dependent on the size and shape of the cavities and the type of material being molded.

While the description of the apparatus according to the invention having the conical tips extending into the conical recesses has been given with respect to a preferred embodiment, it will be evident that various modifications are possible without departing from the scope of the invention as understood by those skilled in the art and defined in the following claims. For instance, it is apparent that other mold configurations having different plates and/or inserts with other names can be used for other applications.

The embodiments of the invention in which an exclusive property or privilege is claimed are defined as follows:

1. In an injection molding apparatus having an elongated heated probe with a rear end, a forward end, an outer body having a generally cylindrical forward portion, and an electrical heating element extending generally longitudinally in the body, the forward portion of the body of the probe having a predetermined outer diameter and a longitudinal central axis, the probe being mounted to extend into a well in a surrounding cavity plate with a melt passage extending between the probe and the surrounding cavity plate, the well having a wall and a forward end with at least one gate extending through the cavity plate to a cavity, the improvement wherein:

the wall of the well at the forward end of the well has at least one conical recess leading to the at least one gate, the at least one conical recess has an included angle of at least 90° and a central axis, the central axis of the conical recess extending outwardly at an angle to the longitudinal central axis of the forward portion of the body of the probe, and the forward end of the probe has at least one conical tip which extends outwardly beyond the outer diameter of the forward portion of the body of the probe a substantial distance into the at least one conical recess in the wall of the well, the at least one conical tip having a central axis which is substantially the same central axis which extends through the at least one conical recess.

2. Injection molding apparatus as claimed in claim 1 wherein the forward end of the well in the cavity plate is generally spherical shaped except for the at least one conical recess.

3. Injection molding apparatus as claimed in claim 2 wherein the at least one conical tip of the probe has an included angle of substantially less than the included angle of the at least one conical recess.

4. Injection molding apparatus as claimed in claim 2 wherein the wall of the well has a plurality of conical recesses equally spaced around the forward end of the well, the probe has an equal number of conical tips equally spaced around the forward end of the probe, and each of the conical tips extends int a respective one of the conical recesses.

* * * * *